United States Patent
Pearson

(10) Patent No.: US 10,635,827 B2
(45) Date of Patent: Apr. 28, 2020

(54) SYSTEMS AND METHODS FOR SECURE ISOLATION OF LEGACY COMPUTER PERIPHERALS

(71) Applicant: Raptor Engineering, LLC, Belvidere, IL (US)

(72) Inventor: Timothy Raymond Pearson, Boone, IL (US)

(*) Notice: Subject to any disclaimer, the term of this patent is extended or adjusted under 35 U.S.C. 154(b) by 245 days.

(21) Appl. No.: 15/809,068

(22) Filed: Nov. 10, 2017

(65) Prior Publication Data

US 2018/0144145 A1   May 24, 2018

Related U.S. Application Data

(60) Provisional application No. 62/424,135, filed on Nov. 18, 2016.

(51) Int. Cl.
| | | |
|---|---|---|
| G06F 21/60 | (2013.01) | |
| G06F 13/42 | (2006.01) | |
| G06F 13/40 | (2006.01) | |
| G06F 13/364 | (2006.01) | |
| G06F 21/85 | (2013.01) | |

(52) U.S. Cl.
CPC .......... G06F 21/606 (2013.01); G06F 13/364 (2013.01); G06F 13/404 (2013.01); G06F 13/4282 (2013.01); G06F 21/85 (2013.01)

(58) Field of Classification Search
CPC .... G06F 21/606; G06F 13/364; G06F 13/404; G06F 13/4282; G06F 21/85
USPC .......................................................... 726/26
See application file for complete search history.

(56) References Cited

U.S. PATENT DOCUMENTS

| | | | | |
|---|---|---|---|---|
| 5,410,654 A * | 4/1995 | Foster | G06F 12/0835 711/147 |
| 6,119,189 A * | 9/2000 | Gafken | G06F 13/387 710/110 |
| 6,131,127 A * | 10/2000 | Gafken | G06F 13/423 710/1 |
| 6,813,689 B2 * | 11/2004 | Baxter, III | G06F 3/0613 710/22 |
| 6,990,549 B2 * | 1/2006 | Main | G06F 13/4045 361/679.4 |
| 7,334,123 B2 * | 2/2008 | Gulick | G06F 21/74 713/160 |
| 7,636,797 B2 * | 12/2009 | Melton | G06F 13/385 710/10 |
| 8,239,603 B2 * | 8/2012 | Dutton | G06F 13/4027 710/307 |
| 8,255,988 B2 * | 8/2012 | Carpenter | G06F 21/575 710/5 |
| 8,327,137 B1 * | 12/2012 | Erb | G06F 21/53 713/164 |
| 9,275,733 B2 * | 3/2016 | Perego | G06F 12/10 |
| 2014/0133585 A1 * | 5/2014 | Shen | H04B 3/542 375/257 |
| 2016/0140067 A1 * | 5/2016 | Gately | G06F 13/364 710/110 |
| 2016/0357991 A1 * | 12/2016 | Hershman | G06F 21/82 |

* cited by examiner

Primary Examiner — David J Pearson
Assistant Examiner — Badri Narayanan Champakesan
(74) Attorney, Agent, or Firm — Pierson IP, PLLC

(57) ABSTRACT

Embodiments disclosed herein describe systems and for isolating data communicated to and from peripherals coupled to an LPC bus or similar shared bus. In embodiments, the isolated data may be communicated to only a targeted peripheral while other peripherals receive masked data.

18 Claims, 6 Drawing Sheets

SYSTEMS AND METHODS FOR SECURE ISOLATION OF LEGACY COMPUTER PERIPHERALS

CROSS-REFERENCE TO RELATED APPLICATIONS

This application claims a benefit of priority under 35 U.S.C. § 119 to Provisional Application No. 62/424,135 filed on Nov. 18, 2016, which is fully incorporated herein by reference in its entirety.

BACKGROUND INFORMATION

Field of the Disclosure

Examples of the present disclosure are related to systems and methods for secure isolation of legacy peripheral devices on a computing system.

Background

Low pin count (LPC) based peripherals are used for a wide variety of security-sensitive low-level tasks on modern computing platforms. For example, low pin count based peripherals may be used for a trusted platform module, keyboard, and firmware storage access. Typically, a shared LPC bus is used to connect multiple LPC peripherals to a central processing unit. However, because the shared LPC bus is a shared bus that requires the knowledge of when other peripherals are communicating data, any peripheral attached to the LPC bus can snoop or even modify data being communicated by another peripheral. This modification of data could be associated with security keys, passwords, and other sensitive data, which is based on the low-level nature of the peripherals typically connected to the LPC bus. Conventionally, to protect sensitive data communicated between peripherals and the central processing unit other standards, such as a universal serial bus (USB) standard, have been used. However, USB and other standards contain other security problems. Additionally, these other standards may not be appropriate for low level on-board communication, limiting their use as a mitigation for LPC security holes.

Accordingly, needs exist for more effective and efficient systems and methods for secure isolation of legacy computer peripherals connected to a LPC bus, wherein a targeted LPC peripheral may receive correct active data and other LPC peripherals connected to the LPC bus may receive masked data while all LPC peripherals receive the same control data.

SUMMARY

Embodiments disclosed herein describe systems and for isolating data communicated to and from peripherals coupled to an LPC bus, ISA bus, SMBus, or similar shared bus that is configured to continuously communicate with the peripherals. In embodiments, the isolated data may be communicated to only a targeted peripheral, while other peripherals receive masked data. Although embodiments may reference LPC systems throughout this document, alternative embodiments may apply to all master/slave shared bus technology, including for example ISA, SMBus, and I2C that utilize similar principles and/or operations.

Embodiments of a bus security controller may be positioned between a general computing logic LPC master and any of the attached LPC peripherals. Additionally, the bus security controller may be connected directly with LPC peripherals, such that data sharing with other LPC peripherals may be controlled by the bus security controller. However, in other embodiments, the bus security controller may be indirectly coupled with LPC peripherals. In embodiments, the bus security controller may be configured to pass through all data signals from a transmitting LPC peripheral to a host central processing unit. The bus security controller may be configured to transmit the active data to the corresponding transmitting LPC peripheral. Additionally, the bus security controller may transmit all control signals from the transmitting LPC peripheral to other attached LPC peripherals. However, the bus security controller may be configured to mask active data that is transmitted to the other LPC peripherals to avoid revealing secret information to the other LPC peripherals.

Embodiments may also include a configurable LPC router. The LPC router may be configured to expose an LPC peripheral interface to only the host central processing unit. The host central processing unit may configure data transmitted from the host central processing unit to a targeted LPC address or address ranges. The configured data may only appear on the targeted LPC device's LPC physical connection or connections, or broadcast the data to all connected LPC peripherals associated with the targeted LPC address ranges. When configured by the host central processing unit to only pass active data to a targeted LPC address, the other LPC peripherals cannot snoop on traffic between the CPU and the targeted LPC peripherals.

Additionally, embodiments may be configured to detect and recover from an LPC bus stall. This may avoid the need for a system restart to restore LPC functionality, For example, if a LPC peripheral ceases to function in the middle of an LPC transaction, the affected device can be logically disconnected and the associated bus stall forcibly released by transaction completion with dummy active or control data.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
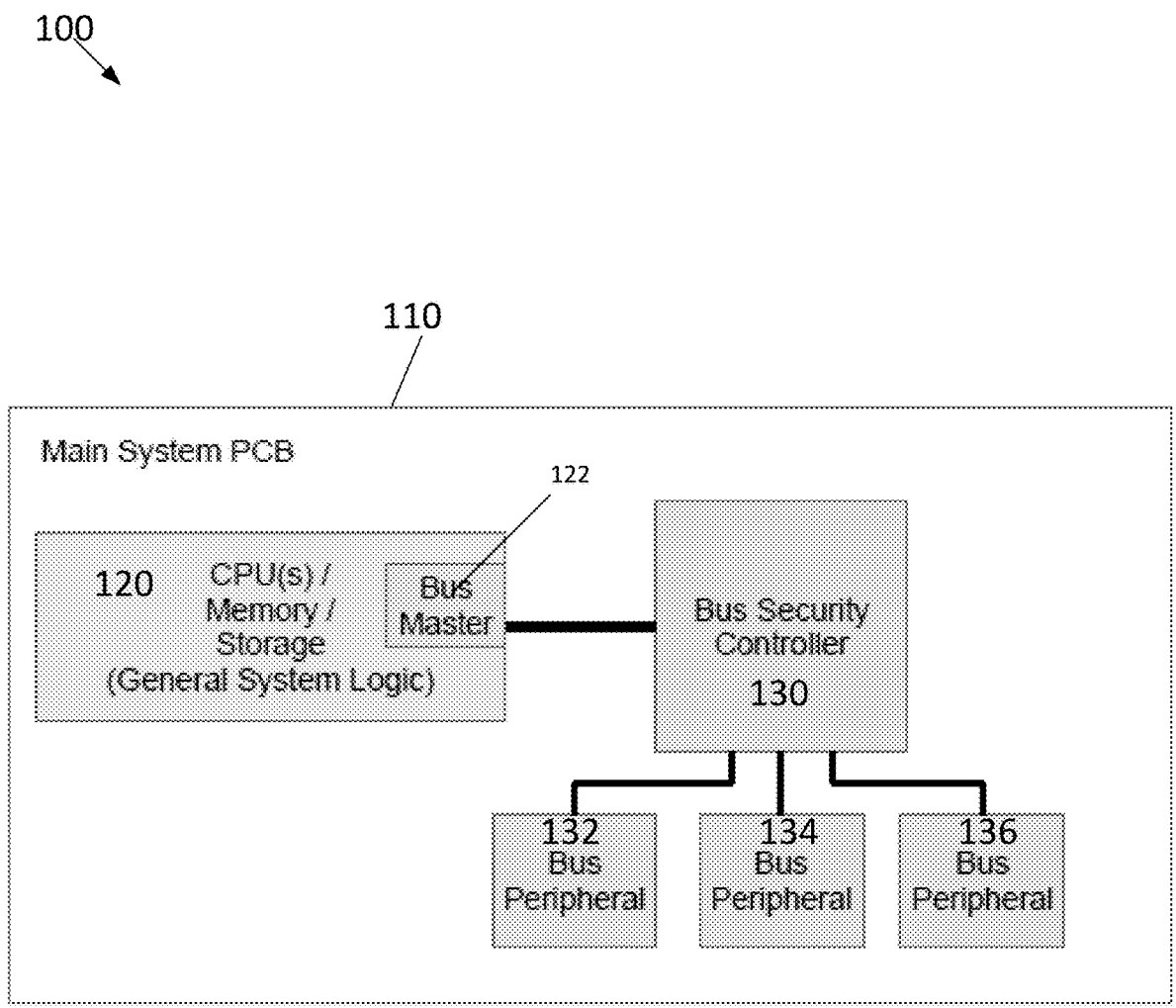
FIG. 1 depicts a topology for a secure isolation system, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Embodiments disclosed herein describe systems and for isolating active data communicated between peripherals coupled to a shared bus, such as an LPC bus or similar synchronized, shared bus. In embodiments, the isolated active data may be communicated to only a targeted peripheral while other peripherals receive masked data.

Turning now to FIG. 1, FIG. 1 depicts a topology for a secure isolation system 100, according to an embodiment. System 100 may include a printed circuit board 110, wherein printed circuit board 110 includes a general logic system 120 with a bus master 122, bus security controller 130, and a plurality of LPC peripheral devices 132, 134, 136.

Printed circuit board 110 may be an electronic circuit that includes thin strips of conducting material that have been etched from a layer fixed to a flat insulated sheet. Printed circuit board 110 may allow the elements of system 100 to be electronically and communicatively coupled to each other.

General logic system 120 may include a hardware processing device including memory, e.g., read only memory (ROM) and random access memory (RAM), storing processor-executable instructions and one or more processors that execute the processor-executable instructions. General logic system 120 may be configured to run an operating system that supports system's 100 basic functions. General logic system 120 may be electronically coupled to bus security controller 130 via bus master 122. The electronic coupling between bus security controller 130 and bus master 122 may be wholly contained in PCB layers that are difficult to physically access, for example in the middle layers of the printed circuit board 110.

Bus master 122 may be a synchronized shared bus communication system that is configured to transfer data between components of system 100. Bus master 122 may be a LPC peripheral bus that is configured to support peripheral devices 132, 134, 136, wherein bus master 122 may be configured to communicate data with peripheral devices 132, 134, 136, where the bus is substantially shared between all connected devices and connected devices generally maintain constant electrical and logical connection with the shared bus. In embodiments, bus master 122 may be a low pin count (LPC) bus that is configured to connect low-bandwidth devices such as general logic system 120 with peripherals 132, 134, 136, which may be legacy I/O devices over serial and/or parallel ports. Bus master 122 may be configured to communicate LPC data, and include a data module, an address module, and control module. The data module may be configured to communicate active data being processed to data ports of the peripherals 132, 134, 136. The address module may be configured to determine an address where the information should be sent. In embodiments the address module may include a mapping of addresses and peripherals 132, 134, 136, wherein each of the addresses is a unique identifier. The control module may be configured to communicate control data from general logic system 120, and return status signals from peripheral devices 132, 134, 136.

Bus security controller 130 may be a device that is configured to be electronically and communicatively coupled to bus master 122 and the peripheral devices 132, 134, 136. Bus security controller 130 may be electronically and/or physically positioned between bus master 122 and the peripheral devices 132, 134, 136. Based on the positioning of bus security controller 130, bus security controller 130 may be configured to isolate data communicated to each of the peripheral devices 132, 134, 136 from bus master 122, while maintaining characteristics from the general logic system's 120 perspective. For example, bus security controller may be configured to allow only a single peripheral device 132, 134, 136 to communicate with bus master 122 at a given instance time.

Bus security controller 130 may be configured to pass through active data over the data lines and control data over control lines between peripheral devices 132, 134, 136 to bus master 122 based on a unique identifier corresponding a peripheral device's address for their data ports and control ports. Bus security controller 130 may be configured to prevent a malicious peripheral from tapping into data transmitted through bus security controller 130 by masking data communicated over any ports not authorized for the current transaction and/or any inactive ports. Bus security controller 134 may be directly connected to each of peripheral devices 132, 134, 136 data line. Each of the data lines and/or ports may not be shared with the other peripheral devices 132, 134, 136. Bus security controller 130 may be configured to pass through active data over the data lines and control data over control lines between peripheral devices 132, 134, 136 to bus master 122. However, responsive to determining a targeted peripheral device 132 of peripheral devices 132, 134, 136 based on an address associated with the control data, bus security controller 130 may be configured to transmit active data over the data lines to only the targeted peripheral's port. The untargeted peripheral devices may receive masked data over the data lines, wherein the active data and the masked data are different. Additionally, bus security controller 130 may simultaneously broadcast the control data over the control lines to each of the peripheral devices 132, 134, 136, wherein the control data may be the same.

Additionally, bus security controller 130 may include a configurable LPC router that is configured to expose a targeted peripheral device 132 to only general system logic 120, and not to the untargeted peripheral devices 134, 136. Therefore, general logic system 120 may be configured to communicate data to a targeted peripheral device via an associated address or address range, or to broadcast data to all connected peripheral devices 132, 134, 136.

In embodiments, bus security controller 130 may also be configured to detect and recover from an LPC bus stall, avoiding the need for a system reset to restore LPC functionality. More specifically, if one of the peripheral devices 132, is not functioning correctly, system 100 may stall. System 100 may stall because bus master 122 or the malfunctioning peripheral device 132 stalls waiting for transmission of data. Based on the positioning of bus security controller 130 between bus master 122 and peripheral devices 132, 134, 136, bus security controller 130 may detect when a peripheral device 132 is malfunctioning, release bus master 122 from current commands, and allow system 100 to continue to function normally. This may restore operation of bus master 122 without a reset of other elements within system 100.

Peripheral devices 132, 134, 136 may by legacy I/O devices that may include serial or parallel ports, PS/2 keyboards, PS/2 mice, disk controllers, BMC devices, firmware Flash interfaces, security controllers, HSMs, etc. Each of the peripheral devices 132, 134, 136 may be an LPC peripheral including an individual address or addresses, and may be configured to receive active data, address data, and control data from bus security controller 130 and/or master bus 122. In embodiments, each of the peripheral devices 132, 134, 136 connected to master bus 122 must have control lines connected to master bus 122, while data lines may be coupled to bus security controller 130. By having the control lines connected to bus master 122 it may be ensured that only a single peripheral device 132, 134, 136 is transmitting data at a given time.

Figure 2:
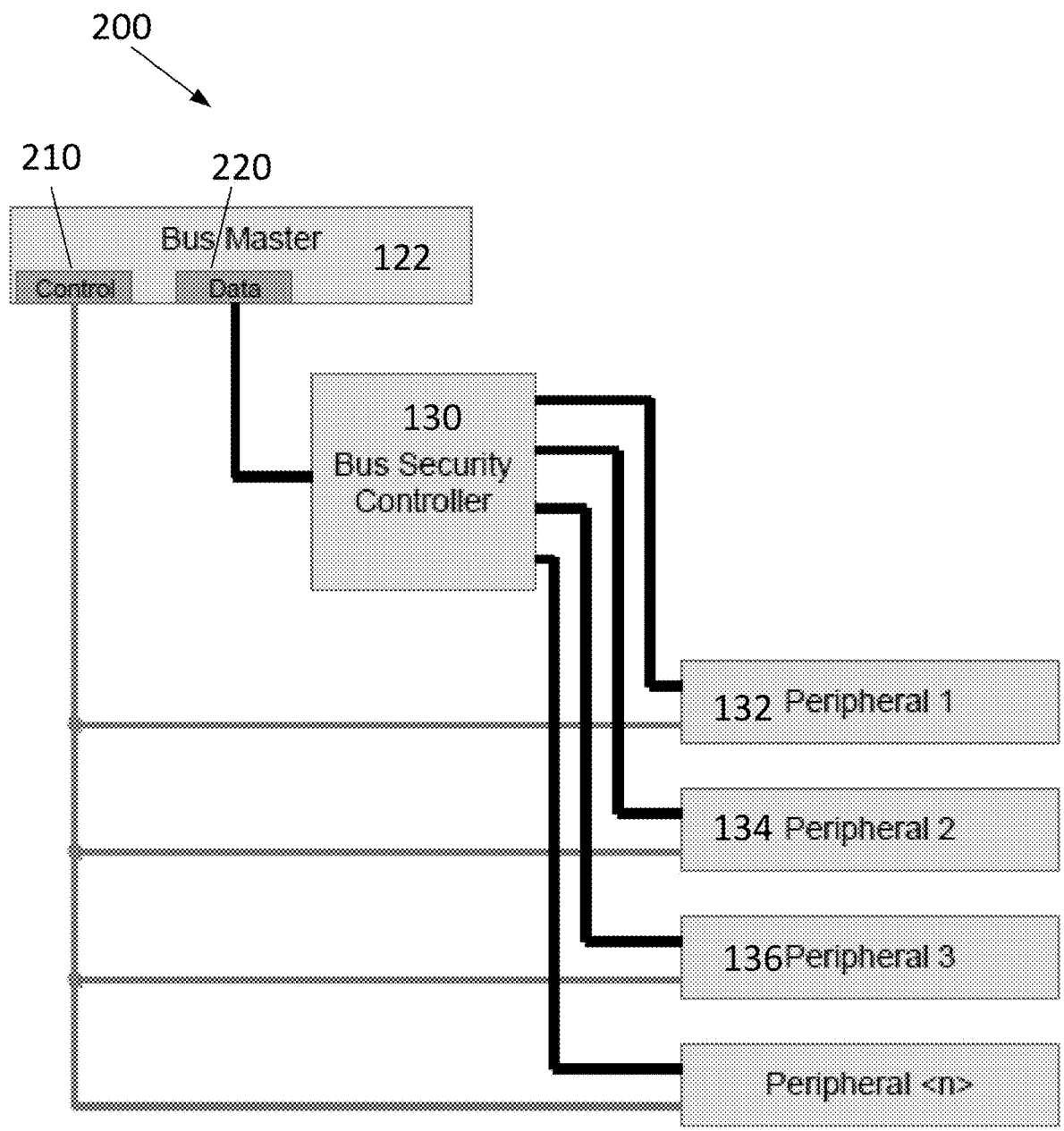
FIG. 2 depicts a variant isolation system, according to an embodiment.

FIG. 2 depicts a variant 200 of system 100, according to an embodiment. Elements of variant 200 may be discussed above. For the sake of brevity, an additional description of these elements is omitted.

As depicted in FIG. 2, bus master 122 may include a control module 210 and data module 220.

The control module 210 may have multiple control lines that are configured to be directly coupled to a corresponding peripheral device 132, 134, 136, etc.

Data module 220 may have a single data line that is directly coupled to bus security controller 130. In embodiments, control module 210 and/or data module 220 may be configured to have address lines coupled to peripheral devices 132, 134, 136 or bus security controller 130, wherein the address lines are configured to transfer address data.

Bus security controller 130 may include a plurality of data lines that are directly coupled to a corresponding peripheral device 132, 134, 136, etc. Further, bus security controller 130 may not include any control lines. In embodiments, control data may be encoded logically via the provided communication lines.

Upon booting up general system logic 100, an address module located with bus master 122 may broadcast an address request to the peripherals 132, 134, 136 to determine each of their corresponding addresses. The address requests may be broadcast to each of the peripherals 132, 134, 136 because the address requests do not include sensitive data. Alternatively, the general system logic 100 may contain a preprogrammed table or other means of storage containing addresses of all attached peripherals 132, 134, 136, obviating the need for an address scan.

General system logic 110 may configure bus security controller 130 to restrict communication to one or more addresses or address ranges to a specific peripheral 132, or combination of peripherals 132, 134, 136. Bus master 122 may transmit active data to bus security controller 130 along with a desired address targeting peripheral device 132 over the data line. Bus security controller 130 may determine that peripheral device 132 is targeted based on the received address, and forward the active data to peripheral device 132 over the data line with the corresponding address. Furthermore, bus security controller 130 may forward masked data, which may be in a known pattern or random data, to the other untargeted peripheral devices 134, 136 over their corresponding data lines based on their addresses. Therefore, only the targeted peripheral device 132 receives the actual active data, and the other peripheral devices 134, 136 receive masked or random data.

While bus security controller 130 is transmitting the actual active data to targeted peripheral device 132 and the masked data to untargeted peripheral devices 134, 136 over the data lines, bus master 122 may simultaneously broadcast the same control data with the targeted peripheral device's 132 address to each of the peripheral devices 132, 134, 136 over each of the control lines. Thus, the untargeted peripheral devices 134, 136 may receive the control signals with the targeted peripheral device's 132 address, determine that it is not a targeted peripheral, and ignore the received masked data. Furthermore, if the untargeted peripheral is a maliciously active peripheral, it will receive the masked data and be unable to harm or leak data from system 100.

When a target peripheral device 132 transmits data to bus master 122, bus security controller 130 may intercept the transmitted active data over the corresponding data line, and route the active data to bus master 122 over the corresponding data line. However, bus security controller 130 may mask the received data transmitted to the other addresses that do not correspond with bus master 122, such that the other peripheral devices 134, 136 may not determine the actual active data was transmitted by targeted peripheral device 132 to bus master 122.

Once the transaction with the targeted peripheral device 132 is complete, the targeted peripheral device 132 may release bus master 122 by transmitting a release signal to release the target peripheral device 132, wherein the release signal is communicated over the control lines from control module 210 to each peripheral device 132, 134, 136. Therefore, each of the other peripheral devices 134, 136 may determine that the transaction with targeted peripheral device 132 is complete based on the relayed release signal.

Figure 3:
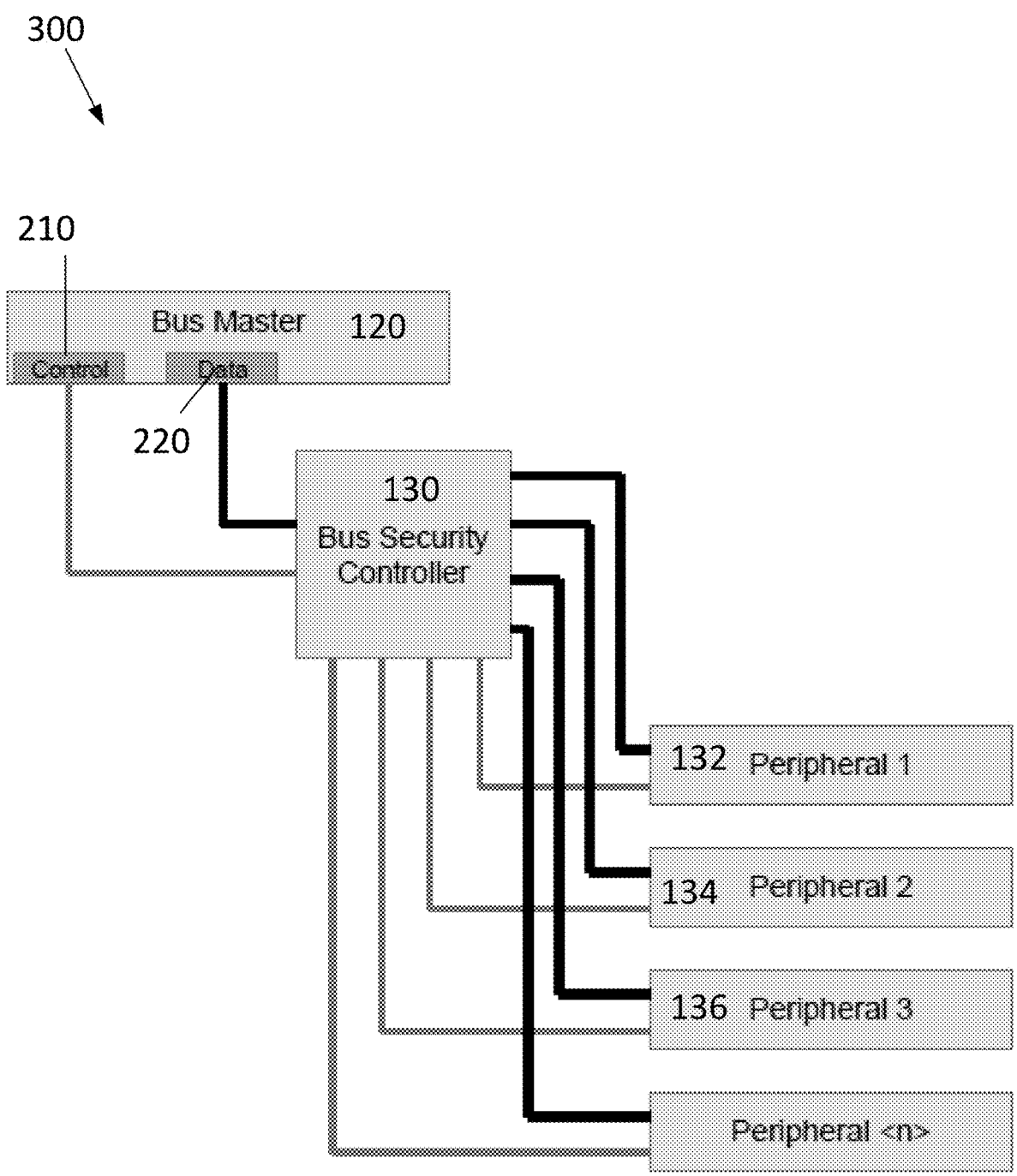
FIG. 3 depicts a variant isolation system, according to an embodiment.

FIG. 3 depicts a variant 300 of system 100, according to an embodiment. Elements of variant 300 may be discussed above. For the sake of brevity, an additional description of these elements is omitted.

As depicted in FIG. 3, bus security controller 130 may be configured to be directly coupled to control module 210 via a single control line. Therefore, all data communicated between bus master 120 and peripheral devices 132, 134, 136 may be transferred through bus security controller 130.

Responsive to bus master 120 transmitting active data and control data to a targeted peripheral 132, bus security controller 130 may intercept all the active data and all the control data, transmit the active data to the targeted peripheral 132 and masked data the untargeted peripherals 134, 136. Simultaneously to transmitting the active data and masked data, bus security controller 130 may broadcast the control data to each of the peripherals 132, 134, 136.

Similarly, responsive to bus security controller 130 receiving data from targeted peripheral 132, bus controller 130 may broadcast masked data and the control data to the untargeted peripheral devices 134, 136, such that the untargeted peripheral devices 134, 136 do not receive the actual active data but receive masked data.

Figure 4:
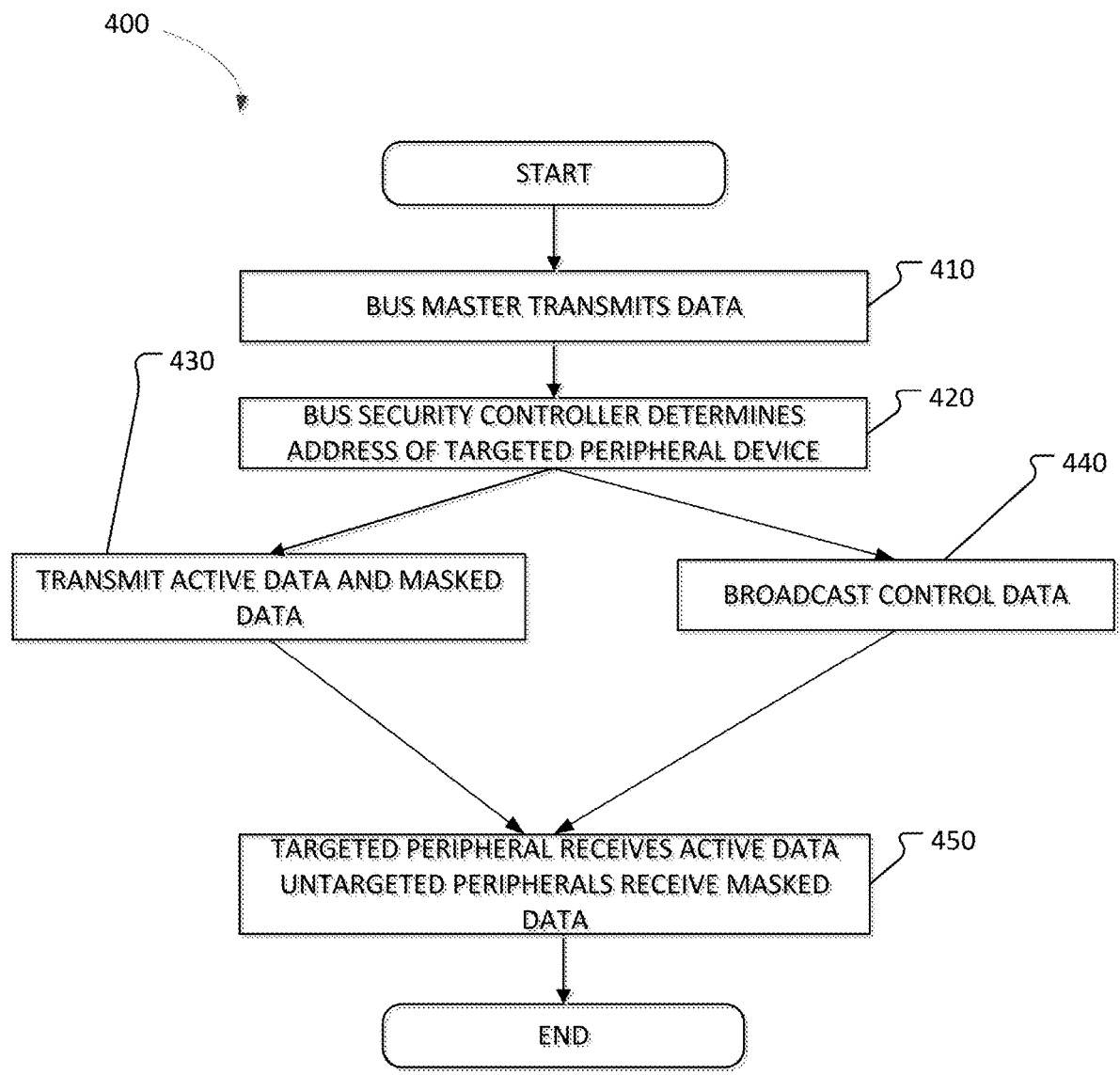
FIG. 4 depicts a method for isolating a legacy peripheral device, according to an embodiment

FIG. 4 illustrates a method 400 for isolating a legacy peripheral device, according to an embodiment. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a solid-state machine, reconfigurable logic, fixed logic, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At operation 410, a bus master may transmit active data, control data, and address data targeting a peripheral device to a bus security controller.

At operation 420, the bus security controller may parse the received address data to determine which of a plurality of peripheral devices is mapped to the received address data.

At operation 430, the bus security controller may transmit the received active data to the targeted peripheral device based on the received corresponding address and masked data to the untargeted peripheral devices, which do not having addresses corresponding to the received address data.

At operation 440, which occurs simultaneously to operation 430, the bus security controller or the bus master may broadcast the control data to all of the peripheral devices, targeted or untargeted.

At operation 450, the targeted peripheral device may receive the active data and the untargeted peripheral devices may receive the masked data, while both receive the same control data. In embodiments, the active data and the masked data may be different data.

Figure 5:
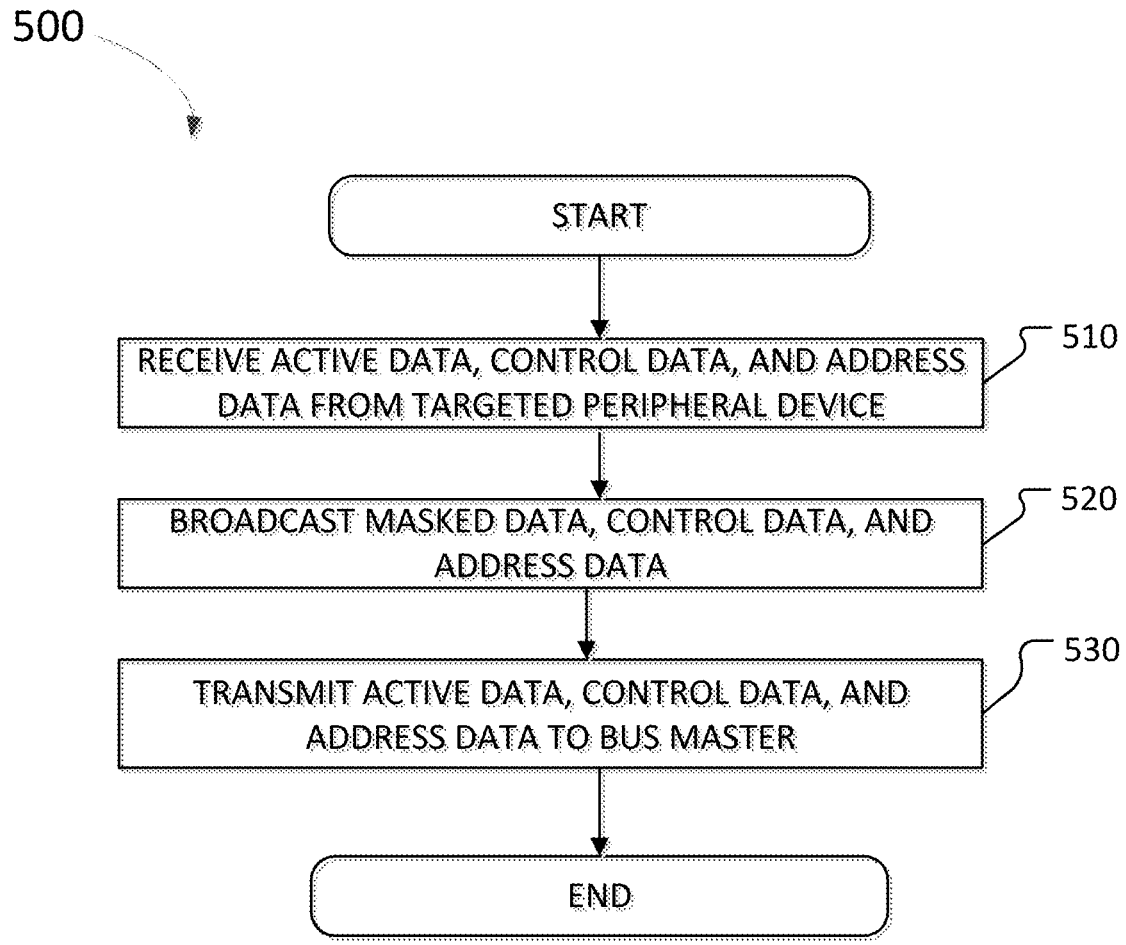
FIG. 5 depicts a method for isolating a legacy peripheral device, according to an embodiment

FIG. 5 illustrates a method 500 for isolating a legacy peripheral device, according to an embodiment. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5 and described below is not intended to be limiting.

In some embodiments, method 500 may be implemented in one or more processing devices (e.g., a digital processor, an analog processor, a digital circuit designed to process information, an analog circuit designed to process information, a solid-state machine, reconfigurable logic, fixed logic, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At operation 510, a targeted peripheral device may transmit active data, control data, and address data to a bus security controller.

At operation 520, the bus security controller may broadcast masked data, control data, and address data to the untargeted peripheral devices.

At operation 530, the bus security controller may transmit the active data, control data, and address data to a bus master.

Figure 6:
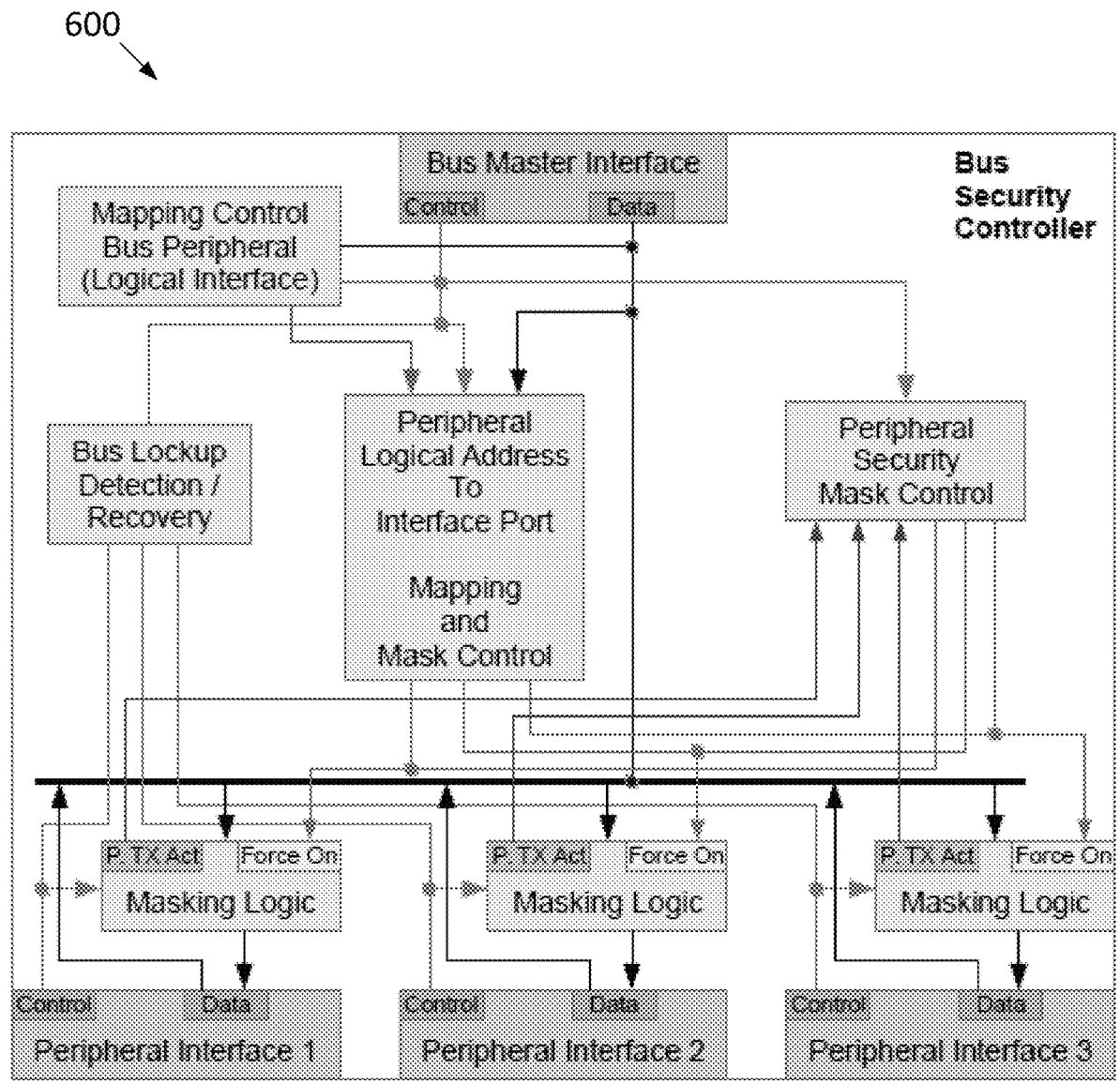
FIG. 6 depicts a detailed variant of an isolation system, according to an embodiment.

FIG. 6 depicts a detailed variant 600 of system 100, according to an embodiment. Elements of variant 600 may be discussed above. For the sake of brevity, an additional description of these elements is omitted.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present embodiments may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable content may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

The flowcharts and block diagrams in the flow diagrams illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagrams.

What is claimed is:

1. A system for secure isolation of devices, the system comprising:
   a plurality of peripheral devices, the plurality of peripheral devices including a targeted peripheral device and untargeted peripheral device;
   a bus master configured to transmit active data and control data;
   a bus security controller being a hardware device positioned electronically between the plurality of peripheral devices and the bus master, wherein the bus security controller is configured to intercept the transmitted active data, the bus security controller having a first data line being configured to communicate the active data to the targeted peripheral and a second data line being configured to communicate masked data to the untargeted peripheral device when the bus security controller is communicating the active data to the targeted peripheral, wherein the first data line and second data line are independent from each other, and the active data and the masked data are different.

2. The system of claim 1, wherein the bus security controller is configured to transmit the control data to the plurality of peripheral devices.

3. The system of claim 1, wherein the plurality of peripheral devices are low pin count peripheral devices.

4. The system of claim 1, wherein the bus master is configured to transmit the active data to the bus security controller and the control data to the plurality of peripheral devices.

5. The system of claim 1, wherein only the targeted peripheral device is configured to communicate with the bus master at a given instance of time.

6. The system of claim 1, wherein the targeted peripheral device is configured to communicate the active data and the control data to the bus security controller.

7. The system of claim 6, wherein the bus security controller is configured to transmit the active data to the bus master.

8. The system of claim 1, wherein the bus security controller is configured to transmit a release command to the bus master to clear the active data responsive to the bus security controller determining at least one of the plurality of peripheral devices is malfunctioning.

9. The system of claim 1, wherein each of the plurality of peripheral devices includes a unique address.

10. A method for securely isolating devices, the method comprising:
    transmitting, via a bus master, active data and control data towards a plurality of peripheral devices, the plurality of peripheral devices including a targeted peripheral device and a untargeted peripheral device;
    positioning, a bus security controller being a hardware device, electronically between the plurality of peripheral devices and the bus master;
    intercepting, via a bus security controller, the active data;
    transmitting, via the bus security controller, on a first data line the active data to the targeted peripheral;
    transmitting, via the bus security controller, on a second data line masked data to the untargeted peripheral device while the bus security controller is transmitting the active data on the first data line; wherein the first data line and second data line are independent from each other, and the active data and the masked data are different.

11. The method of claim 10, wherein the bus security controller is configured to transmit the control data to the plurality of peripheral devices.

12. The method of claim 10, wherein the plurality of peripheral devices are low pin count peripheral devices.

13. The method of claim 10, wherein the bus master transmits the active data to the bus security controller and the bus master transmits the control data to the plurality of peripheral devices.

14. The method of claim 10, wherein only the targeted peripheral device is configured to communicate with the bus master at a given instance of time.

15. The method of claim 10, further comprising
    receiving, by the bus security controller from the targeted peripheral device, the active data and the control data.

16. The method of claim 15, wherein the bus security controller is configured to transmit the active data to the bus master.

17. The method of claim 10, further comprising:
    determining at least one of the plurality of peripheral devices is malfunctioning;
    transmitting, via the bus security controller, a release command to the bus master to clear the active data.

18. The method of claim 10, wherein each of the plurality of peripheral devices includes a unique address.

* * * * *